United States Patent Office 3,751,494
Patented Aug. 7, 1973

3,751,494
PURIFICATION OF CHLORINATED HYDROCARBONS EMPLOYING MOLECULAR SIEVES
Norman L. Beckers, Chardon, Ohio, assignor to Diamond Shamrock Corporation, Cleveland, Ohio
No Drawing. Filed Mar. 8, 1971, Ser. No. 122,088
Int. Cl. C07c 21/12
U.S. Cl. 260—654 S                      2 Claims

ABSTRACT OF THE DISCLOSURE

Saturated, partially-chlorinated, hydrocarbons, such as partially-chlorinated ethanes, are removed from unsaturated chlorocarbon and chlorinated hydrocarbons, such as perchloroethylene, by treatment with type 13X molecular sieves. In this manner saturated, partially-chlorinated, hydrocarbons are dehydrochlorinated and the products of dehydrochlorination are at least partially adsorbed. Any remaining dehydrochlorination products may be subsequently separated by fractional distillation.

BACKGROUND OF THE INVENTION

Many commercial processes are known for the production of various unsaturated chlorocarbon and chlorinated hydrocarbon solvents, such as perchloroethylene. In these processes the product emanating from the reactor is almost invariably contaminated with numerous by-products of varying degrees of chlorination. The majority of such by-products may readily be removed by fractional distillation, since a sufficient difference exists between the boiling points of the desired product and the contaminants. Unfortunately, however, in many processes certain of these contaminants have boiling points so similar to the desired product that the practical removal of trace amounts thereof by fractional distillation is not possible on a commercial basis. For example, in the various processes for the production of perchloroehtylene (boling point 121° C.), certain saturated chlorinate hydrocarbons such as 1,1,2-trichloroethane (1,1,2-TCA, B.P. 114° C.), sym-tetrachloroethane (S-tet, B.P. 146° C.) and uns-tetrachloroethane (U-tet, B.P. 129° C.), are often encountered and defy complete removal by practical fractional distillation methods.

With the solvent perchloroethylene, for example, many uses require a total impurity content of less than 1,000 parts per million, the fluorocarbon industry for example often specifying impurity levels of less than 50 p.p.m. Through refinements in the processes for production of perchloroethylene it is possible to reach by distillation a total impurity level of less than 500 p.p.m., often less than 200 p.p.m., with some degree of consistency. A further reduction in impurity content by distillation is impractical. Attempts to catalytically crack the saturated impurities or to remove same by chemical treatment have proven costly and difficult owing to the relatively low level of the impurity. Therefore a practical means is required to consistently reduce the impurity content of unsaturated chlorocarbons and chlorinated hydrocarbons to the level demanded by segments of the industry.

STATEMENT OF THE INVENTION

It is an object of the present invention to provide a process for improving the purity of unsaturated chlorocarbons and chlorinated hydrocarbons.

It is a further object of the present invention to provide a process for reducing the content of partially-chlorinated ethanes in perchloroethylene.

A still further object of the present invention is to provide a process for reducing the total amount of impurities present in perchloroethylene.

These and further objects of the present invention will become apparent to those skilled in the art from the specification and claims which follow.

A process has now been found for removing saturated chlorinated hydrocarbons from unsaturated chlorocarbon and chlorinated hydrocarbon solvents which process comprises passing said solvent through a bed of type 13X molecular sieves having an effective pore size of 9–10 A. and a formula corresponding to:

$$M_2O \cdot Al_2O_3 \cdot 2.8 \pm 0.5 SiO_2$$

wherein M represents an alkali metal. The process is found to be particularly effective for removing partially-chlorinated ethanes from perchloroethylene, especially where the partially-chlorinated ethanes content is less than 1,000 p.p.m. prior to treatment with the molecular sieve. Since the molecular sieve treatment results in at least partial dehydrochlorination of the saturated chlorinated hydrocarbons, and since the products of this dehydrochlorination may not be completely adsorbed by the molecular sieve, it is often desirable, in order to achieve the highest possible degree of purity, to subject the perchloroethylene to fractional distillation subsequent to treatment with the molecular sieve according to the present invention.

The invention has the advantage that it may be adopted as a "polishing step" in many processes for the production of unsaturated chlorocarbon and chlorinated hydrocarbon solvents since little in the way of extra equipment is required, the invention functioning quite well at ambient temperatures and pressures in the liquid phase. By this method not only is it possible to achieve a high degree of purity with respect to saturated chlorinated hydrocarbons but also the total impurity content is substantially reduced, especially if the solvent is subsequently subjected to fractional distillation.

DESCRIPTION OF THE PREFERRED EMBODIMENTS

The use of molecular sieves is known to effect separations, in both the gas and the liquid phase, based on differences between the materials to be separated with respect to both molecular size and affinity for the molecular sieve. However these considerations render the present invention all the more surprising since the molecular sizes of, for example, U-tet and perchloroethylene are substantially the same. Furthermore, as alluded to hereinabove, the removal of the various saturated chlorinated hydrocarbons, particularly ethanes, is based to a large extent upon the fact that these materials appear to be dehydrochlorinated, even at essentially ambient temperatures, in the presence of the molecular sieve. This phenomenon may be evidenced by the introduction of perchloroethylene containing a known amount of tri- and tetrachloroethanes and trichloroethylene into a molecular sieve bed as described hereinbelow. Analysis of the effluent from the bed shows a sharp decrease in tri- and tetrachloroethane contents attended by an increase in the amount of trichloroethylene and the presence of dichloroethylenes, originally absent. This may be attributed only to the fact that dichloroethylenes and trichloroethylene are, respectively, the dehydrochlorination products of tri- and tetrachloroethanes. The invention is rendered further surprising by the fact that it is apparently only the type 13X molecular sieves which result in the desired combination of dehydrochlorination and adsorption.

Materials defined as molecular sieves are well known in the art to be crystalline metal aluminosilicates (zeolites) interlaced with pores of uniform size leading to inner cavities in the crystal lattice. The specific sieves useful in this invention are the 13X type zeolites having an effective pore size of 9–10 A. and conforming generally to the formula:

$$M_2O \cdot Al_2O_3 \cdot 2.8 \pm 0.5 SiO_2$$

wherein M represents an alkali metal, particularly sodium. The preparation and characteristics of such sieves are further described, for example, in U.S. Pat. 2,882,244. Such sieves are supplied commercially as powders, cubes, spheres and pellets, often incorporating an inert binder, such as clay.

In general the process of the present invention is useful for treating any unsaturated chlorocarbon or chlorinated hydrocarbon having at least two carbon atoms, for the removal therefrom of closely boiling impurities which are saturated chlorinated hydrocarbons, generally having a like number of carbon atoms. This statement is qualified, however, by the fact that the molecular size of the materials treated must be such as to allow their penetration into the crystal lattice of the molecular sieve, that is, 10 A. or less. In view of their commercial significance, the invention will find most application in the removal of partially-chlorinated ethanes from at least partially-chlorinated ethylenes, such as trichloroethylene and perchloroethylene. Because of its particular significance, referred to most often hereinafter is the treatment of perchloroethylene to remove, or reduce in amount, such impurities as 1,1,2-TCA, S-tet and U-tet. By treatment with the molecular sieve, at least a portion of the saturated impurities will be converted to their respective dehydrochlorination products, cis-dichloroethylene, trans-dichloroethylene and vinylidene chloride and trichloroethylene. In turn, at least a portion of these dehydrochlorination products, together with any like compounds originally present, will be adsorbed by the molecular sieve.

Of course the action of the molecular sieve on the saturated chlorinated hydrocarbons also results in the production of hydrogen chloride. Owing to the corrosive nature of hydrogen chloride, and for the obvious reason of attempting to conserve the relatively expensive molecular sieve, it is most often desirable to subject the product being treated, such as perchloroethylene, to a preliminary treatment, such as fractional distillation, to reduce the level of impurities subject to dehydrochlorination to a minimum amount prior to passage through the molecular sieve. Generally it is desirable to treat a product containing less than 1,000 p.p.m., preferably less than 500 p.p.m. and especially less than 200 p.p.m., saturated chlorinated hydrocarbons. It is also possible to obviate the destructive effect of the hydrogen chloride somewhat by incorporation of a suitable acid acceptor, such as an amine stabilizer, into the material being treated.

It has been noted that the efficiency of the treatment with a molecular sieve varies more with the nature of the impurity to be removed than the level of that impurity, all other factors being equal. While efficiencies approaching 100% have been obtained, for example, with respect to removal of U-tet from perchloroethylene, efficiencies on the order of 75% are more readily to be expected in a commercial operation.

The invention is suitable to batch or continuous processing, the rate of flow in a continuous process being easily determined depending upon such considerations as bed size, desired efficiency and the like. Elevated temperatures are not required for an efficient operation, the reaction proceeding readily within a temperature range of 10–90° C., thus maintaining a liquid phase. Vapor phase operation, generally more inconvenient, is not required.

The unsaturated dehydrochlorination products resulting from treatment with the molecular sieve are not necessarily completely adsorbed by the sieve. However, owing to the disparity in boiling points between these dehydrochlorination products and the, for example, perchloroethylene, they are readily, and relatively completely, removed by subsequent fractional distillation. In this manner it is quite feasible by distillation to obtain an unsaturated impurity level of about 20 p.p.m. Therefore, if there is introduced to a molecular sieve bed according to the present invention, perchloroethylene having a total partially-chlorinated ethanes content of 120 p.p.m., and the dehydrochlorination and adsorption mechanism is 75% efficiency (leaving 30 p.p.m. saturated impurities), upon subsequent distillation a total impurity level of less than 50 p.p.m. is realized.

After extended periods of operation, it will be noted that the ability of the molecular sieve to efficiently remove impurities is reduced. At such time it is desirable for economic reasons to regenerate the sieve so that it may be reused with good efficiency. Regeneration may be simply and effectively accomplished by the application of sufficient heat to raise the temperature of the sieve and the surrounding container to a point whereat the adsorbate and any occluded liquid are vaporized and may be removed by the action of a purge gas. The significant factor is the temperature to which the temperature to which the sieve itself is raised. Generally a temperature within the range of 200–325° C. will suffice, although any temperature up to about 590° C. may be used without destruction of the sieve. Such temperatures are generally achieved indirectly by heating the container, although the passage through the sieve of a dry preheated purge gas, such as air, is also recommended.

It has been found that a molecular sieve of the present invention, subjected to regeneration ten times as described above, retains 83% of its original ability to remove saturated impurities. Further, examination shows essentially 100% of original crystallinity retained and a water capacity of about 19%, both indicative of no substantial degradation.

Example 1

The solution to be purified is perchloroethylene at a temperature of 27° C. containing less than 1 p.p.m. vinylidene chloride, 1 p.p.m. trichloroethylene, 334 p.p.m. 1,1,2-TCA and 42 p.p.m. U-tet. The type 13X molecular sieve employed has an effective pore size of about 10 A. and a formula corresponding to $Na_2O \cdot Al_2O_3 \cdot 2.8SiO_2$ and is provided in the form of cylindrical 1/16 inch diameter pellets. A bed of said sieve is established in a one inch steel pipe, employing 494 grams of sieve to give a bed depth of 51 inches. Twenty liters of the perchloroethylene solution is passed through the bed at an average feed rate of 32 milliliters per minute. The perchloroethylene is reanalyzed and is found to contain 8 p.p.m. vinylidene chloride and 20 p.p.m. trichloroethylene but only 12 p.p.m. chlorinated ethanes. By the process of the present invention, 97% of the chlorinated ethanes contained in the perchloroethylene have been eliminated.

Example 2

A molecular sieve bed is established to a depth of 60 inches employing 582 grams of sieve as defined in Example 1, twice regenerated at a temperature of about 320° C. The perchloroethylene treated contains 108 p.p.m. 1,1,2-TCA, 139 p.p.m. U-tet and 38 p.p.m. S-tet. After passage through the bed at an average flow rate of 24 milliliters per minute, the perchloroethylene is found to contain about 11 p.p.m. combined chlorinated ethanes, thus exhibiting a 93% effective removal.

While the invention has been described with reference to certain preferred embodiments thereof, it is not to be so limited since alterations and changes may be made therein as is indicated by the scope of the appended claims.

I claim:

1. A process for removing partially-chlorinated ethanes from perchloroethylene, which comprises passing the perchloroethylene at a temperature within the range of 10° to 90° C. through a bed of type 13X molecular sieve having an effective pore size of 9–10 A. and a formula corresponding to $M_2O \cdot Al_2O_3 \cdot 2.8 \pm 0.5 SiO_2$, wherein M represents an alkali metal.

2. A process for removing at least a portion of the partially-chlorinated ethanes from perchloroethylene containing less than 1,000 p.p.m. of same, which process consists essentially of:

(a) passing said perchloroethylene through a bed of type 13X molecular sieve having an effective pore size of 9–10 A. and a formula corresponding to $M_2O \cdot Al_2O_3 \cdot 2.8 \pm 0.5 SiO_2$, wherein M represents an alkali metal, at a temperature of from 10° to 90° C., whereby at least a portion of the partially-chlorinated ethanes are dehydrochlorinated and adsorbed, (b) subjecting the effluent from the molecular sieve bed to fractional distillation to remove at least a portion of any remaining, unadsorbed, dehydrochlorination products of the partially-chlorinated ethanes and, (c) recovering purified perchloroethylene.

References Cited
UNITED STATES PATENTS

| | | | |
|---|---|---|---|
| 2,084,937 | 6/1937 | Britton et al. | 260—654 S |
| 2,920,122 | 1/1960 | Milton et al. | 260—654 D |
| 3,140,322 | 7/1964 | Frilette et al. | 260—654 D |

BERNARD HELFIN, Primary Examiner

J. A. BOSKA, Assistant Examiner

U.S. Cl. X.R.

260—654 D